M. C. SCHWEINERT AND H. P. KRAFT.
INFLATING COUPLING.
APPLICATION FILED SEPT. 7, 1915.

1,304,814.

Patented May 27, 1919.

WITNESSES:
Fred White
René Bruine

INVENTORS:
Maximilian Charles Schweinert
and Henry P. Kraft,
By Attorneys.
Fraser, Turk & Myers

UNITED STATES PATENT OFFICE.

MAXIMILIAN CHARLES SCHWEINERT, OF WEST HOBOKEN, AND HENRY P. KRAFT, OF RIDGEWOOD, NEW JERSEY.

INFLATING-COUPLING.

1,304,814.

Specification of Letters Patent.

Patented May 27, 1919.

Application filed September 7, 1915. Serial No. 49,221.

*To all whom it may concern:*

Be it known that we, MAXIMILIAN CHARLES SCHWEINERT, of West Hoboken, in the county of Hudson and State of New Jersey, and HENRY P. KRAFT, of Ridgewood, in the county of Bergen and State of New Jersey, both citizens of the United States of America, have invented certain new and useful Improvements in Inflating-Couplings, of which the following is a specification.

This invention relates to inflating devices and is particularly adapted for use in connection with pneumatic tires.

The invention is especially directed to what may be termed a coupling adapted to connect a reservoir or tank of compressed air with the pneumatic tire or other device to be inflated. Such tanks have heretofore been provided with a hand-operated valve or cock or with an automatic valve designed to prevent the flow of air outwardly through the coupling when the device is not in use. The present invention provides an improved structure of the class which has automatic means which normally closes the pipe line from the tank or reservoir, and which is released or pushed out of position in the act of applying the coupling to the tire valve. In the preferred form of the invention we provide a device in which an automatic valve is introduced in a line preferably close to the coupling, and means are provided for contacting with the tire valve, which means when the coupling is pressed down on the top of the valve move upwardly and unseat the check valve in the coupling. By this construction it is necessary only to press the coupling into position when it is desired to inflate the tire and remove it when the inflating operation is finished.

Referring to the drawings which illustrate several embodiments of the invention,—

Figure 1:
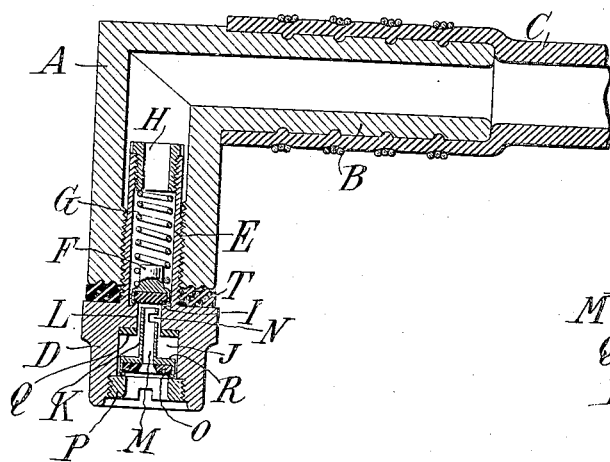
Figure 1 is a central vertical section of the preferred form of the coupling, being shown in its closed position.
Figure 2:
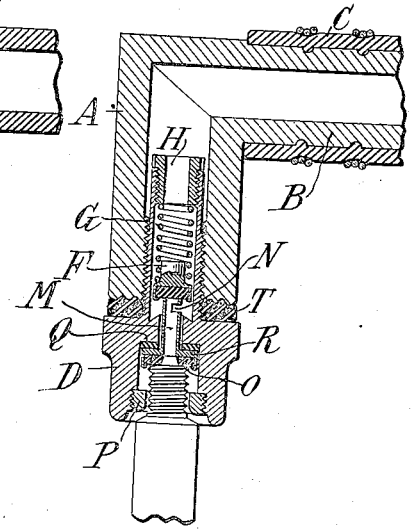
Fig. 2 is a similar section, showing the coupling applied to a tire valve and in its open position.

Referring to Figs. 1 and 2 of the drawings, let A indicate the casing which is provided with an angled portion B which serves the purpose of a handle, and which is formed with a nipple to which a rubber tube or hose pipe C is suitably attached as shown. The object of this construction is to provide a device which is short from top to bottom so that it may be readily inserted between the spokes of a wheel. At the bottom of the casing A is preferably provided a foot D which has an extension E screwing up within the casing, in which extension is located a check valve F closing with the pressure, and preferably loaded with a spring G, the lower end of which presses upon the valve F and the upper end of which is secured within the extension E by a screw top or thimble H. At the lower portion of the extension E the foot D is formed with a valve seat I with which the valve F coacts. The foot is also provided with an outlet chamber J in its lower part in which works a packing carrier and unseating member K, the stem of which projects through an opening or passage L into position where it can engage the valve F. The stem member is formed with a longitudinal passage M communicating with a lateral passage N so that air may flow through it when it engages with the packing of the valve F and moves the latter from its seat. The enlarged part of member K is provided with a perforated packing O designed to make a tight joint with the top of the valve shell as shown in Fig. 2. The member K is shown as held in place by a screw-threaded collar P having a central opening to admit the tire-valve, and guide the device when being applied to such valve. In order to prevent leakage around the carrier or member K when the valve is open I provide a packing Q against which the shoulder R of the unseating member contacts, as shown in Fig. 2. The member K and packing hence in effect comprise a valve adapted to close the opening L in so far as to prevent the passage of air through the latter except that which passes through the bore M in the member K.

The operation of the device will be apparent from the foregoing. When the coupling is pressed down on the top of the valve shell the end of the shell engages the packing O of the member K and presses the latter upwardly until it unseats the valve F and the shoulder R engages the packing Q.

A tight joint is thus secured with the valve shell and leakage is prevented. Air under pressure from the reservoir passes down through the extension E around the valve F and through the bore M of the member K and thence into the valve shell, thus unseating the tire valve and entering the tire.

In the construction shown in Figs. 1 and 2 wherein the foot D is formed separately from the casing A an annular packing T is interposed between the two to make a tight joint at this point.

Figure 3:
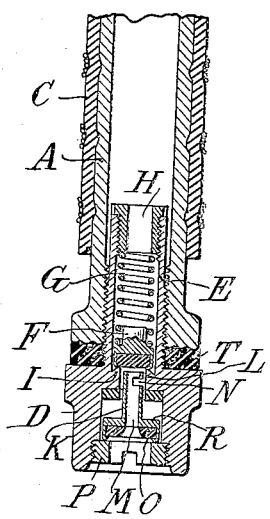
Fig. 3 is a similar section of a modified form.

The construction shown in Fig. 3 is similar to that shown in Figs. 1 and 2 with the exception that the hand piece is straight instead of angular. In both the constructions shown in Figs. 1 and 2 and 4 the foot D with its valve mechanism can be easily removed and replaced if worn or damaged without necessitating the duplication of the heavier and more expensive hand piece. To inspect or renew the packings O Q it is only necessary to unscrew the collar P.

While we have shown in detail several forms of the invention, it will be understood that we do not wish to be limited thereto since various changes can be made therein without departing from the invention.

What we claim is:—

1. An inflating device for pneumatic tires comprising a casing formed of a handle-member having a hose nipple, and a foot projecting beyond said member and having an extension screwing into said member, said casing having a valve chamber formed in the foot, a check-valve in said chamber, and a removable top for the foot partially closing the inner end of said chamber, whereby the check-valve is accessible by unscrewing said foot.

2. An inflating device for pneumatic tires comprising a casing formed of a handle-member having a hose nipple, and a foot projecting beyond said member and having an extension screwing into said member, said casing having a valve chamber formed in the foot, a check-valve and spring in said chamber, and a screw top confining said spring and partially closing the inner end of said chamber, whereby the check-valve and spring are accessible by unscrewing said foot.

3. An inflating device for pneumatic tires comprising a casing formed of a handle-member having a hose nipple, and a foot projecting beyond said member and having an extension screwing into said member, said casing having a valve chamber formed in such extension, and an outlet chamber formed in the foot, a check-valve in said valve-chamber, and a packing carrier and packing in said outlet chamber, and an annular screw-collar entering said outlet-chamber to confine said packing and carrier, its opening serving to receive the end of a tire-valve and guide the device thereon, and whereby the carrier and packing are accessible by unscrewing said collar.

In witness whereof, we have hereunto signed our names in the presence of two subscribing witnesses.

MAXIMILIAN CHARLES SCHWEINERT.
HENRY P. KRAFT.

Witnesses:
  E. V. MYERS,
  FRED WHITE.